United States Patent [19]
Ryan

[11] 3,926,378
[45] Dec. 16, 1975

[54] HAY STACK DISINTEGRATING APPARATUS

[75] Inventor: Kelly P. Ryan, Blair, Nebr.
[73] Assignee: Blair Manufacturing Company, Blair, Nebr.
[22] Filed: Jan. 30, 1975
[21] Appl. No.: 545,619

[52] U.S. Cl. ......... 241/154; 241/101 A; 241/101.7; 241/189 R
[51] Int. Cl.² ........................................ B02C 13/20
[58] Field of Search............ 241/101 A, 101.7, 154, 241/186 A, 189 A, 223, 243

[56] References Cited
UNITED STATES PATENTS

| | | |
|---|---|---|
| 2,989,252 | 6/1961 | Babb .............................. 241/101 A |
| 3,863,850 | 2/1975 | Freeman ......................... 241/101.7 |

Primary Examiner—Granville Y. Custer, Jr.
Attorney, Agent, or Firm—Wegner, Stellman, McCord, Wiles & Wood

[57] ABSTRACT

The present invention provides an apparatus for disintegrating hay stacks which includes a bed upon which a hay stack is placed, a conveyor on the bed for moving the stack toward a plurality of vertically arranged rolls to disintegrate or pull apart the hay stack, dropping the hay into a well from which it is fed into a cutting roll which cuts the hay into small pieces suitable for immediate consumption by cattle.

5 Claims, 4 Drawing Figures

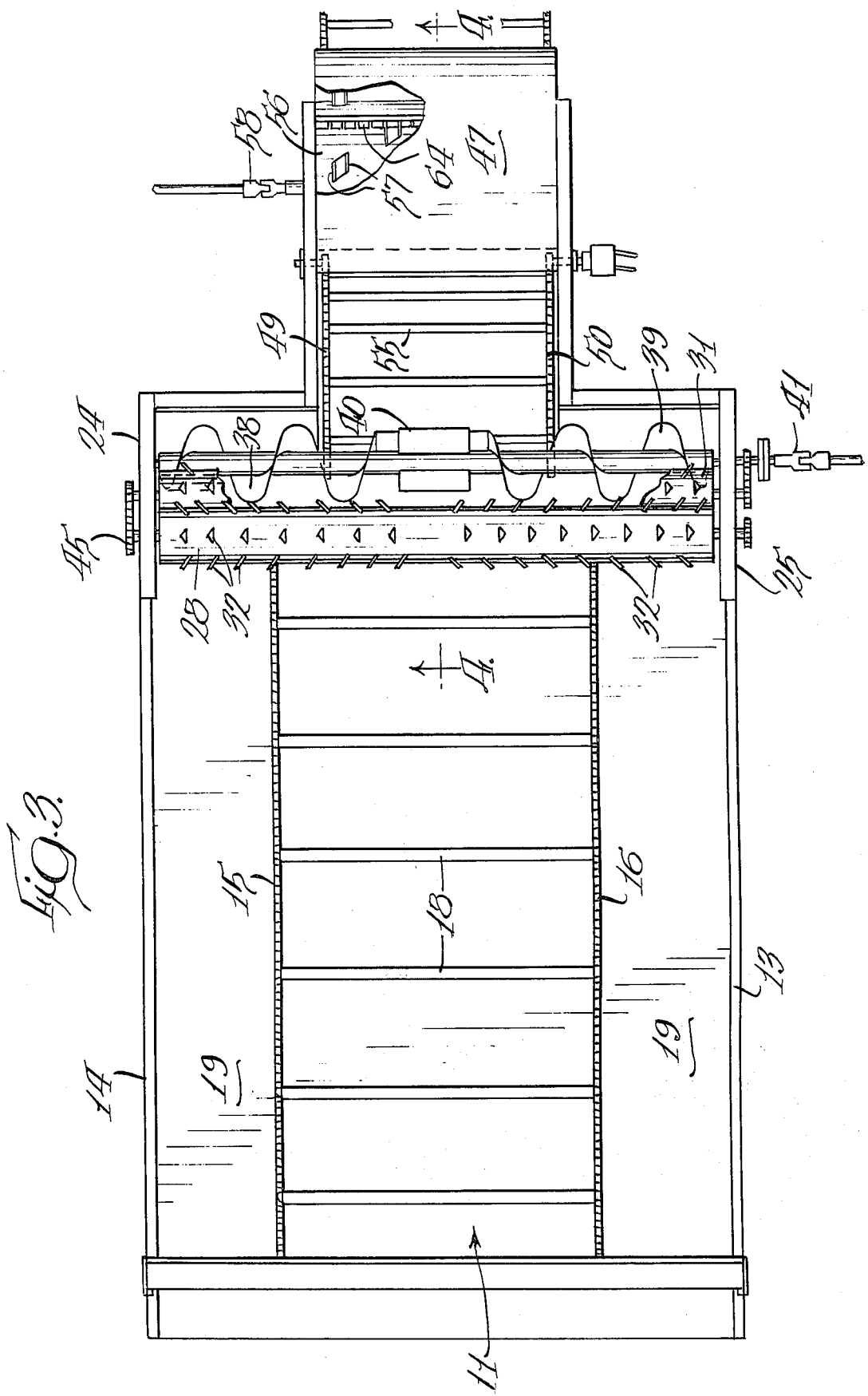

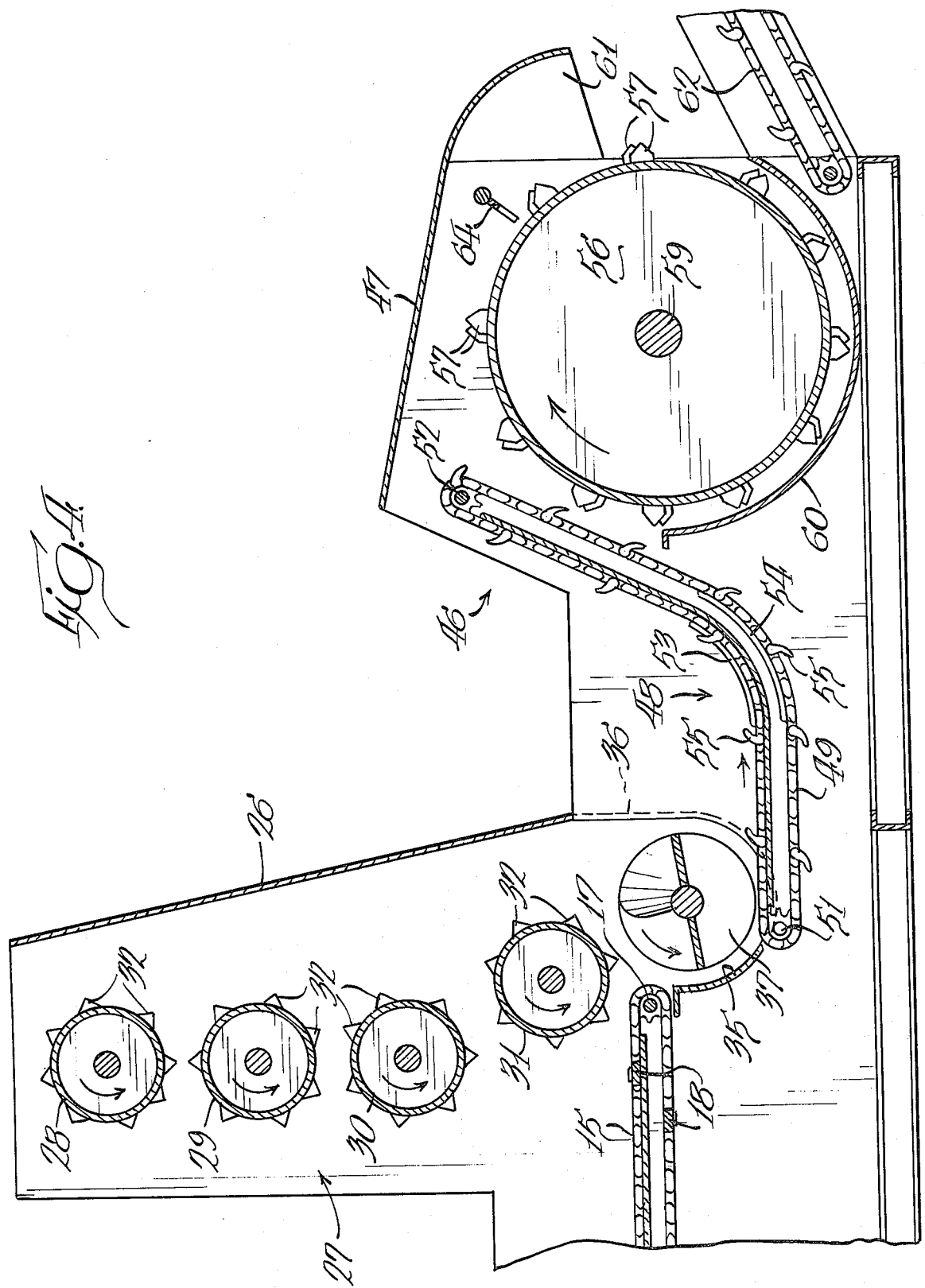

HAY STACK DISINTEGRATING APPARATUS

BACKGROUND OF THE INVENTION

The use of hay stacks as a means for storing and preserving cattle fodder has been in existence for centuries. Normally, such stacks were built by hand with the farmer forking hay to the top, or by the use of a form of elevator that elevated the hay and dropped it on a stack. Recently, more efficient equipment has been used to build hay stacks, such equipment comprising generally a tractor-drawn apparatus which picks up the hay, places it into a form, compresses it periodically until a compact stack of the proper size has been created, and then ejects the fully formed stack from the apparatus. All this is accomplished as the tractor draws the equipment over the field of cut hay, and the hay is thus picked up, packed, and stacked. Hay stacks so formed have considerable integrity, i.e., the individual stalks making up the stack have substantial length and are intertwined and interlocked to a surprising degree. Where feeding is accomplished simply by allowing the cattle access to a stack, a good deal of the hay is wasted, as the animals will tend to eat on a level with their head and a good deal of the hay below that level is trampled and rendered useless. With the rising price of feed corn, more and more cattle are being fed on hay rather than corn and a need exists for providing means to render the feeding of cattle not only simpler but for preventing waste of the fodder itself.

SUMMARY OF THE INVENTION

There is available on the market a trailer type device adapted to pick up a hay stack bodily for transport to a different area. Normally, such devices consist of a trailer bed which can be tilted downwardly and maneuvered by a tractor so that the lower end of the trailer is pushed partially under one end of the hay stack whereupon a conveyor on the trailer bed is activated to draw the stack onto the trailer bed. The hay stack can be dropped off the trailer by simply reversing the above procedure.

The apparatus of the present invention is adapted to receive a hay stack from such a trailer and by means of rotating rolls disintegrate the stack and drop the stalks comprising the same into a receiving area or well from whence they are delivered to a hay chopping apparatus which cuts the stalks into short lengths for discharge and in condition to be readily eaten by cattle. The apparatus of the invention can be used in combination with an elevator which receives the prepared chopped hay and delivers it to a wagon or other means for conveying the prepared hay to the place wher it is to be consumed. The apparatus of the present invention need not be constantly attended, and one man can make repeated trips to pick up a number of hay stacks and deliver them to the apparatus of the invention which will automatically, and without the need for manual control, disintegrate and cut the stack into suitable and desirable cattle feed.

BRIEF DESCRIPTION OF THE DRAWINGS

FIG. 3 is a top plan view partially broken away for clarity of illustration of the apparatus shown in FIG. 1; and FIG. 4 is a vertical sectional view taken along line 4—4 of FIG. 3.

DESCRIPTION OF THE PREFERRED EMBODIMENT

Figure 1:
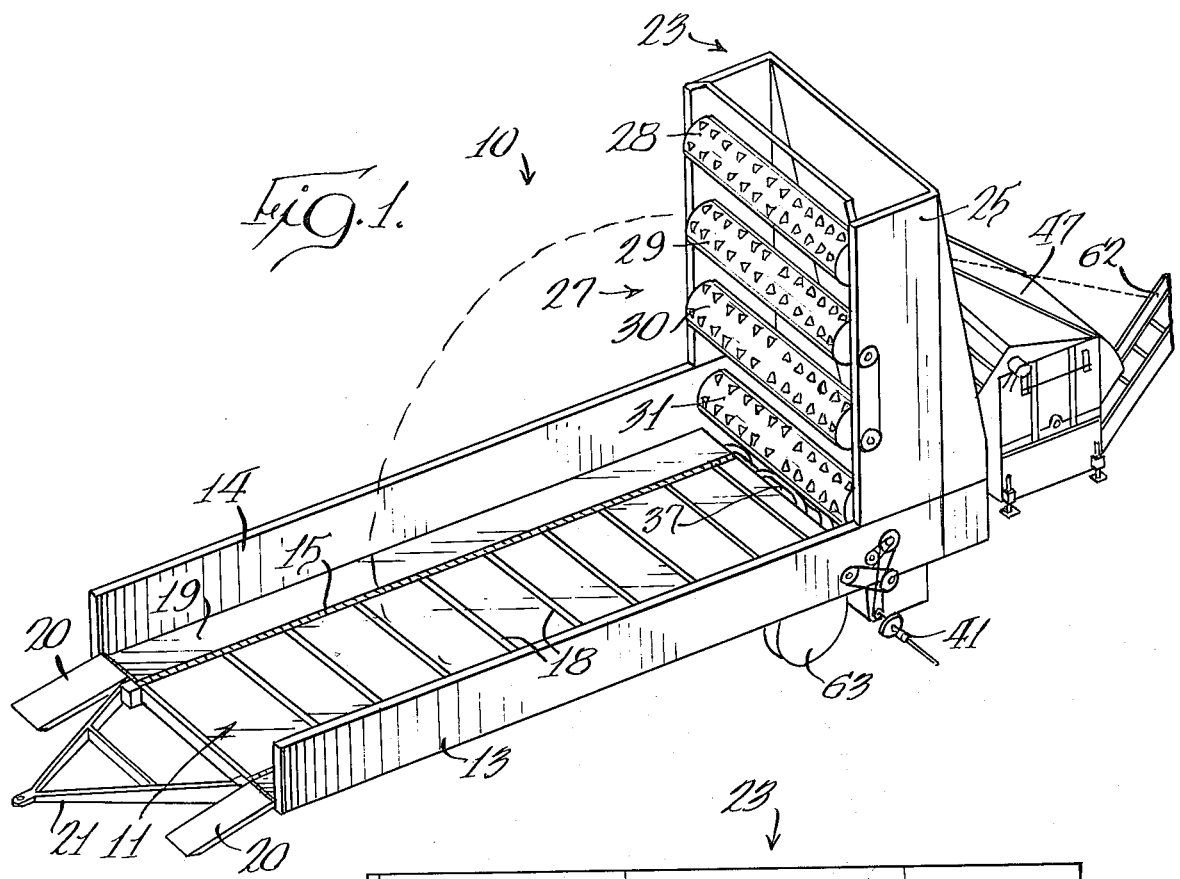
FIG. 1 is a perspective view of an apparatus embodying the present invention.
Figure 2:
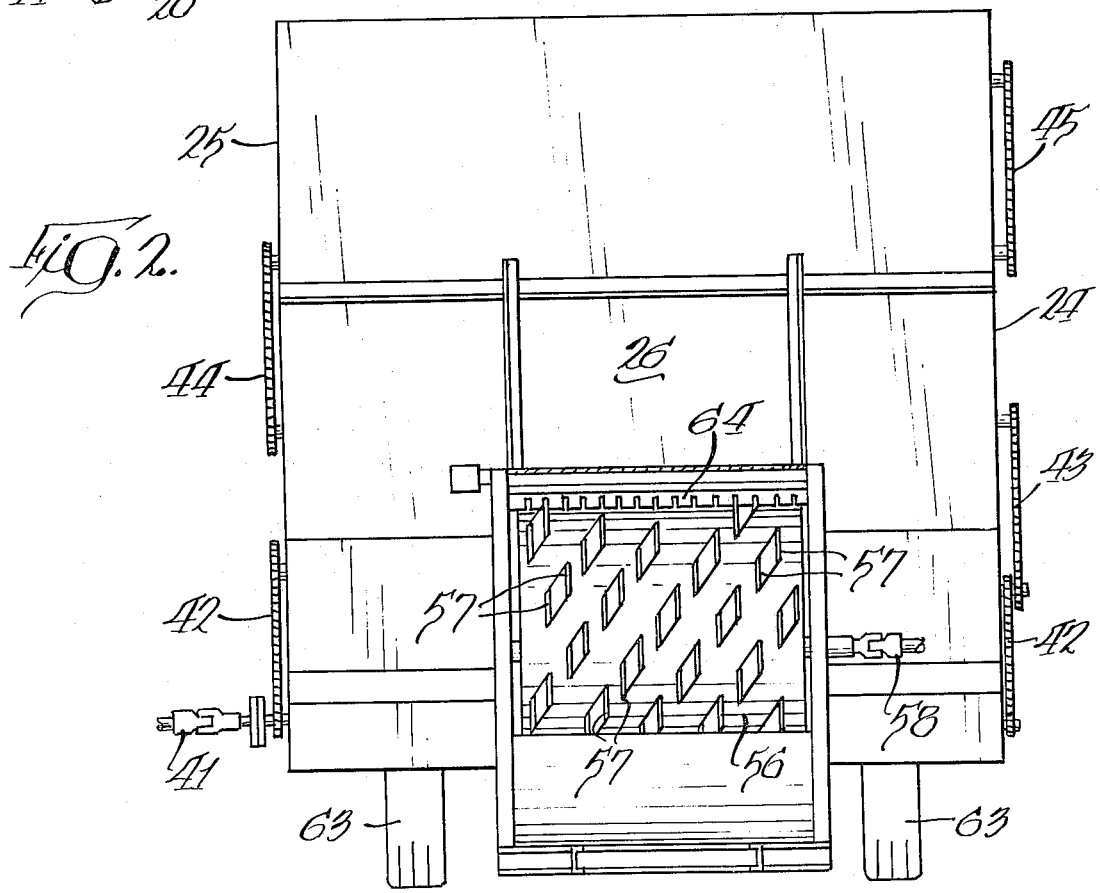
FIG. 2 is a plan end view of the apparatus shown in FIG. 1.

Referring now to the drawings, there is shown a hay stack disintegrating apparatus 10 which includes a flat bed 11 extending between two vertical side walls 13 and 14 with the side walls being spaced apart at a distance somewhat greater than the normal width of a hay stack. The hay stack forming apparatus previously discussed normally will make a stack about 8 ft. wide, 10 ft. high, and from 14 to 21 ft. long. Thus, the bed 11 and the side walls 13 and 14 are proportioned to accommodate such stacks. Extending along the center portion of the bed 11 is a conveyor in the form of spaced parallel endless chains 15 and 16 rotating around Extending between the chains are a number of flights 18 which, together with the chains, form the conveying apparatus. The conveyor has a width somewhat less than the width of the bed 11 to provide space for runways 19 adjacent the side walls to permit the wheels of the trailer carrying the hay stack to roll thereover in the process of delivering the hay stack to the bed. A pair of ramps 20 are hingedly attached to the bed adjacent the end of the runways 19 to provide a path from the ground to the runways for the wheels of the trailer. Means in the form of a trailer hitch 21 are provided so that the apparatus may be transported.

At the end of the bed 11 opposite the entrance end where the ramps 20 are located there is provided an upright housing 23 including a pair of vertical side walls 24 and 25, and an end wall 26. Mounted for rotation in the housing 23 is a vertical array 27 of a plurality of horizontally extending rotatable rolls. In the particular embodiment chosen for illustration, four disintegrating rolls 28, 29, 30, and 31, are shown, with each of the rolls being provided with a plurality of disintegrating teeth 32, with the teeth being arranged in staggered rolls as best shown in FIG. 3. In the particular embodment chosen, each of the rolls 28–31 is approximately 2 ft. in diameter and the space between the rolls is preferably of the order of 1½ in. The rolls themselves extend the width of the bed 11.

Positioned below the lowermost roll 31 is a well 35 which extends below the level of the bed 11 and is provided with a central discharge opening 36. Rotatably mounted within the well 35 is a reverse-flighted auger 37 having one flight 38 formed to convey material in the well to the center, and a reversely arranged flight 39 also arranged to convey material in the well to the center portion. At the center portion of the auger there is provided a paddle arrangement 40 to aid in ejecting the material conveyed to the center of the well out through the discharge opening 36.

A power input 41 is provided adapted to be attached to the power takeoff of a tractor or other source of rotating power, and directly drives the auger 37. By means of a pair of chain and sprocket elements 42 the lowermost roll 31 is driven which, by means of the chain and sprocket arrangement 43, drives the roll 30. The roll 30 in turn drives the roll above at 29 through the chain and sprocket arrangement 44 and a higher chain and sprocket arrangement 45 drives the uppermost roll 28. All of the rolls are driven in the same direction and at the same speed. The conveyor comprising the chains 15 and 16 and flights 18, is also driven slowly through the power system just described, the details of such drive not being illustrated as conventional arrangements are quite suitable.

Extending outwardly from the rear wall 26 of the apparatus is an extension 46 which supports a hood 47 at the outermost end. Carried by the extension 46 is a second conveyor 48 including a pair of endless chains 49 and 50 passing over sprockets 51 and 52 at each end and over arcuate guides 53 and 54 whereat the conveyor changes direction. A plurality of flights 55 extends between the chains 49 and 50 and with the chains serve as an elevating conveyor. At the rearmost portion of the extension 46 is a hay chopper in the form of a drum 56 rotatably mounted and provided with a multiplicity of cutting teeth 57. means 58 attachable to a source of power is provided for rotating the drum on its shaft 59 in the direction shown. Extending parallel to the shaft 59 and for substantially the width of the drum 56 is an arcuate plate 60 which assists the teeth 57 in chopping the hay fed to the hay chopper. Outwardly of the hay chopper is a discharge opening 61 which must be located directly over an elevator 62 of usual construction.

A pair of wheels 63 is provided on the bed for the purpose of ground transport.

In operation, a hay stack is dumped on the bed 11 and the mechanism including the conveyor 15–18, rolls 27, elevator 48, and drum 56 are set in motion by the means previously described. As the hay stack is advanced slowly toward the array of rolls 27 and encounters the same, the teeth thereon serve to disintegrate the stack, in effect pulling it apart into more or less individual stalks. The disintegrated hay falls into the well 35 and is transported by the auger therein to the central discharge opening where it is discharged onto the elevating conveyor 48. This latter device drops the hay on top of the hay chopper and the teeth 57 mounted on the drum 56 chop the hay into small particles, i.e., short lengths, which are delivered from the discharge opening 61. The arcuate plate 60 extending the width of the drum and being relatively closely spaced to the ends of the teeth 57 aid in the hay chopping operation. To prevent long particles of hay from wrapping around the drum 56 and thus interfering with the cutting operation, there is provided a comb-like member 64 provided with teeth located to pass between the spaced parallel cutting teeth 57.

Hay in short lengths may be delivered from the discharge opening 61 to the elevator 62 of normal construction which elevates the hay onto a feed wagon or other desired vehicle for transport to the place of consumption.

During the course of disintegrating the stack, it will for the most part retain its integrity, i.e., be advanced as a body which is disintegrated by the rolls 27 as it comes in contact with the teeth thereon. It sometimes happens, however, that at the very end of the stack the last couple feet of hay will be advanced almost at once and thus a large amount of hay will be introduced and ejected from the well at one time. By providing the elevator 48 between the discharge opening 36 of the well and the hay chopper drum 56, space is provided to accommodate such "slugs" of hay, and thus hay may build up on the surface of the conveyor 48 and be delivered thereby in manageable increments to the hay chopper drum 56. Thus, clogging of the drum 56 and the teeth thereon is prevented and jamming of the apparatus will not occur.

I claim:

1. Apparatus of the character described comprising, a bed of a size sufficient to receive and support a hay stack; a conveyor on the bed; a vertical array of horizontally arranged toothed rolls rotatably mounted at one end of the bed, said array being of hay stack height and extending transversely substantially the width of the bed; a hay chopper at said end of the bed; means for rotating the rolls; means for operating the conveyor to feed a hay stack on the bed into the rolls to disintegrate the stack; and means for feeding hay disintegrated by the rolls into the hay chopper.

2. Apparatus of the character described comprising, a bed of a size sufficient to receive and support a hay stack; a conveyor on the bed; a vertical array of horizontally arranged toothed rolls rotatably mounted at one end of the bed, said array being of hay stack height and extending transversely substantially the width of the bed; a well extending transversely of and substantially the width of the bed positioned below the lowermost roll of said array; a hay chopper at said end of the bed; means for rotating the rolls; means for operating the conveyor to feed a hay stack on the bed into the rolls to disintegrate the stack; and means in the well for feeding hay disintegrated by the rolls into the hay chopper.

3. Apparatus of the character described comprising, a bed of a size sufficient to receive and support a hay stack; a conveyor on the bed; a vertical array of horizontally arranged toothed rolls rotatably mounted at one end of the bed, said array being of hay stack height and extending transversely substantially the width of the bed; a well extending transversely of and substantially the width of the bed positioned below the lowermost roll of said array; a rotatably mounted toothed drum positioned at said end of the bed; means for rotating the rolls, means for operating the conveyor to feed a hay stack on the bed into the rotating rolls to disintegrate the hay stack; a reverse-flighted auger in said well; means for rotating said auger to feed disintegrated hay to the center of the well and a discharge opening at the center of the well to permit passage of disintegrated hay to the toothed drum.

4. Apparatus of the character described comprising, a bed of a size sufficient to receive and support a hay stack; a conveyor on the bed; a vertical array of horizontally arranged toothed rolls rotatably mounted at one end of the bed, said array being of hay stack height and extending tranversely substantially the width of the bed; a rotatable toothed drum positionend on the opposite side of said array from the conveyor and spaced therefrom; means for rotating the rolls and the drum; means for operating the conveyor to feed a hay stack on the bed into the rolls to disintegrate the hay stack; and a second conveyor for feeding hay disintegrated by the rolls onto the rotating drum.

5. Apparatus of the character described comprising, a bed of a size sufficient to receive and support a hay stack; a conveyor on the bed; a vertical array of horizontally arranged toothed rolls rotatably mounted at one end of the bed, said array being of hay stack height and extending transversely substantially the width of the bed; a rotatable toothed drum positioned on the opposite side of said array from the conveyor and spaced therefrom; means for rotating the rolls and the drum; means for operating the conveyor to feed a hay stack on the bed into the rolls to disintegrate the hay stack; a well extending transversely of and substantially the width of the bed positioned below the lowermost roll of said array; a reverse-flighted auger in said well; means for rotating the auger to feed disintegrated hay to the center of the well; a discharge opening in the center of the well; and a second conveyor for feeding hay discharged from said opening onto the rotating drum.

* * * * *